July 24, 1962  G. VANDE SANDE  3,046,518
ULTRASONIC VEHICLE DETECTOR SYSTEM
Original Filed Aug. 30, 1960  4 Sheets-Sheet 1
FIG. IA.
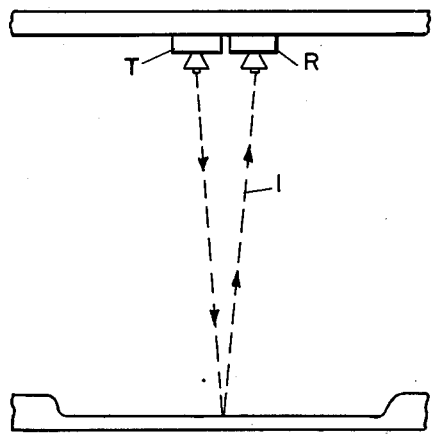
FIG. IB.
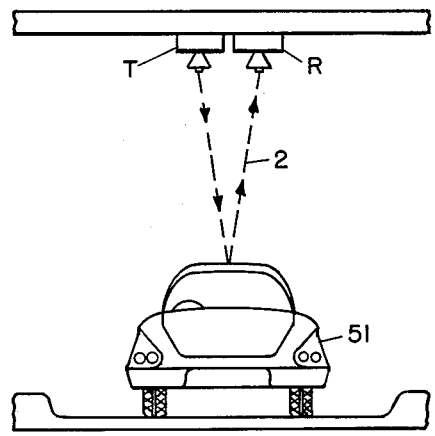
FIG. 6.
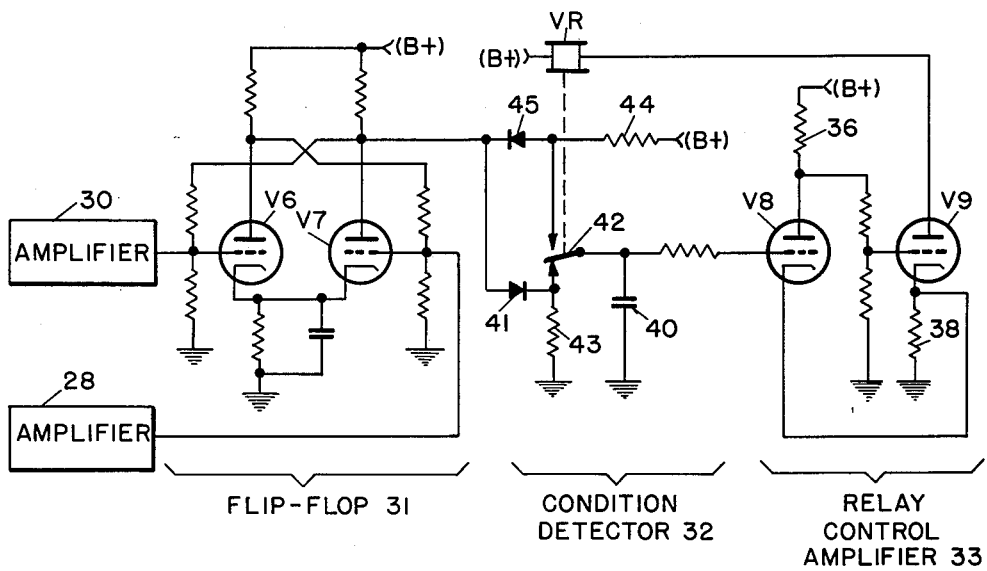
INVENTOR.
G. VANDE SANDE
BY
HIS ATTORNEY July 24, 1962 G. VANDE SANDE 3,046,518
ULTRASONIC VEHICLE DETECTOR SYSTEM
Original Filed Aug. 30, 1960 4 Sheets-Sheet 2

INVENTOR.
G. VANDE SANDE
BY
HIS ATTORNEY

INVENTOR.
G. VANDE SANDE

INVENTOR.
G. VANDE SANDE
BY
HIS ATTORNEY

United States Patent Office 3,046,518
Patented July 24, 1962

3,046,518
ULTRASONIC VEHICLE DETECTOR SYSTEM
George Vande Sande, Bethesda, Md., assignor to General Railway Signal Company, Rochester, N.Y.
Continuation of application Ser. No. 52,876, Aug. 30, 1960. This application Dec. 18, 1961, Ser. No. 161,335
16 Claims. (Cl. 340—38)

This invention relates to the detection of objects and especially vehicles and more particularly pertains to such systems wherein the objects or vehicles are detected as a result of the effects produced by their passing through a beam of sound energy. This application is a continuation of my copending application Ser. No. 52,876, filed August 30, 1960, and now abandoned in favor of this application. The invention of the present application is analogous in subject matter to, and is an improvement over, what is disclosed and claimed in the prior applications of H. C. Kendall, Ser. No. 808,736, filed April 24, 1959, and of J. H. Auer, Jr., Ser. No. 30,667, filed May 20, 1960, both of which are assigned to the assignee of the present invention.

In the systems disclosed in these two prior applications, a beam of repetitive sound pulses is directed across the path of each object or vehicle. A receiver is included which has a sound transducer so positioned and directed that it is responsive to the reflections of each sound pulse from the vehicle as it intercepts the transmitted sound beam. The transmitted sound beam is additionally so directed and the receiving transducer so positioned that, in the absence of a vehicle, the transmitted sound energy is instead reflected from a fixed reflecting surface which is more remote than the vehicle back to the receiving transducer. The sound can impinge upon this fixed reflecting surface only when no vehicle is present, since the vehicle when present blocks the sound beam. Such an arrangement is readily provided by positioning both transmitting and receiving transducers over a line of traffic and directing both downwardly so that the transmitted sound beam is directed toward and reflected from the top of each passing vehicle when it is within the beam but is instead reflected from the pavement when no vehicle is present.

Because of the considerably longer propagation time which is involved when a sound pulse is reflected from the pavement rather than from the top of a passing vehicle, each pavement reflection pulse is received at a later time with respect to the transmitted pulse than is the vehicle reflection pulse. Electronic gating circuits are used in the systems of these prior applications which demarcate successive time intervals following the transmission of each sound pulse, and these gating circuits make it possible to distinguish a pavement reflection from a vehicle reflection. Incidentally, the repetition rate of the transmitted sound pulses is made sufficiently slow to permit each sound pulse to be received by the receiving means following its reflection from a vehicle within the designated detection zone prior to the transmission of the next sound pulse. This requirement eliminated ambiguity since it relates each reflection pulse definitely to the last-transmitted pulse.

The prior application Ser. No. 808,736, in particular discloses how it is possible to achieve a very high degree of accuracy in vehicle detection so as to discriminate clearly between the desired vehicles to be counted and other extraneous objects. This is brought about, in part, by so organizing the system that a single count can be registered only by going through a prescribed cycle of events. Such cycle comprises: first, the reception of reflections from the top of a passing vehicle concurrently with the interruption of sound reflections from the pavement at the time the vehicle enters the sound beam; and second, the re-establishment of pavement reflections concurrently with the interruption of the previously received vehicle reflection pulses. The dual requirement that both vehicle reflections be received and pavement reflections be concurrently interrupted of considerable effect in eliminating spurious responses which might otherwise result from the passage of people or animals, for example, through the detection zone. Thus, a person passing through the beam might very well be able to reflect an occasional pulse back to the receiving transducer, but it is not likely that such person could at the same time entirely block the sound beam so as to prevent all reflections from the pavement. Such a system also provides that a vehicle having a plurality of sound reflecting surfaces spaced by non-reflecting surfaces (a convertible car, for example (will be counted as a single vehicle, rather than as two separate vehicles corresponding to each of the spaced sound reflecting surfaces; in other words, the failure of the pavement reflections to be received when the cloth top is within the sound beam prohibits the restoration of the registering means to its normal condition so that the subsequent recurrence of vehicle reflections is not identified as coming from a second vehicle.

In the prior systems of this general type, it has been deemed necessary to provide a plurality of electronic timing circuits to demarcate the respective intervals during which vehicle and pavement reflections can be expected. Separate amplifiers are provided for the pavement and vehicle reflection pulses and each has applied to it a signal corresponding to that received by the receiving transducer so that each, of course, receives both the pavement and vehicle reflections. The timing circuits just described selectively gate these two amplifiers, permitting the vehicle reflection amplifier to be operative only throughout the time that vehicle reflection pulses can be expected and similarly permitting the pavement reflection amplifier to be operative only throughout the time that pavement reflections can be expected. As a result when no vehicle is present, the pavement reflection amplifier produces an output signal for each transmitted sound pulse, but no output signal is, under these circumstances, obtained from the vehicle reflection amplifier. On the other hand, when a vehicle is present, the conditions are reversed in that there is then no output signal from the pavement reflection amplifier, but an output pulse is obtained from the vehicle reflection amplifier for each sound pulse that is transmitted. An output circuit is distinctively operated in accordance with which one of these two conditions is existent at any time and thereby provides a distinctive indication of the passage of a vehicle through the sound beam.

From the foregoing description it becomes apparent that a considerable amount of electronic circuitry must be employed not only to generate the sound pulses but also to distinguish between the pavement and vehicle reflection pulses. It is, therefore, desired by this invention to provide a vehicle detector system having all the desirable attributes of the system just described but to accomplish this with a less complex organization.

Described briefly, it is contemplated by the present invention to provide all of the functions normally provided by the various timing and gating circuits by a constantly rotating magnetic storage drum or disc. On one track of the drum designated as a "sound pulse generator track" is recorded a signal pulse having a frequency and duration corresponding to that of the desired sound pulse to be transmitted. Once for each revolution of the drum, this brief recorded signal is read by a magnetic transducer or "read" head whose output is then applied to an amplifier circuit and with the output of the amplifier applied directly to the transmitting transducer. Each revolution of the drum, therefore, results in the transmission of a respective sound pulse.

The reflection signals picked up by the receiving transducers are amplified and applied to two recording heads, each one associated with a respective track on the drum. One of these tracks can have recorded thereon only the vehicle reflection signals, and the other only the pavement reflection signals. The reason for this selective recording is that each of these two latter tracks does not have the recording medium placed about its entire circumference but only on that portion of its circumference which will be opposite the respective recording head throughout the time that the particular reflection pulse to be recorded thereon can be expected at the receiving transducer. In other words, the particular track which is provided for recording only vehicle reflection pulses has the recording medium on only that portion of its circumference which will pass beneath the associated recording head throughout the interval encompassing the expected possible reception time of vehicle reflection pulses. Corresponding conditions exist with respect to the other track so that only pavement reflection pulses can be recorded thereon. An erasing head is associated with each of these latter two tracks and continually erases the recording medium on that track prior to its passing the "record" head, so that the presence of a recorded reflection pulse on either track means that it must represent a reflection of the last-transmitted sound pulse. A reading head is also provided for each of these two reflection recording tracks and is energized as the drum continues its rotation by any reflection pulse signal which might just prior thereto have been recorded on the respective track but not yet erased.

When no vehicle is present, so that only pavement reflection pulses are received, each one will be recorded upon the particular associated track and will thereafter be immediately read by the read head for that track before it is erased so that a signal pulse will be generated in the read head winding for each revolution of the drum. However, when a vehicle is present, the pavement reflections are blocked so that no pulse can be recorded on the particular track provided for the momentary storage of pavement pulses. Instead, a vehicle reflection pulse will occur for each revolution of the drum and will be recorded on the other track, being thereafter immediately read by the "read" head for that track. Circuit means is associated with the two read heads and is operated to one particular condition when repetitive output pulses are produced from the one read head and to an opposite condition when they are obtained from the other read head. The condition of this latter circuit then indicates the presence of a vehicle within the sound beam. As will later be described, this organization also inherently provides the same high degree of discrimination previously referred to so that highly accurate vehicle counting will result.

It is thus an object of the present invention to provide a vehicle detection system wherein the discrimination between vehicle and pavement reflection pulses is effected in a greatly simplified manner, not reqiring the use of any electronic timing or gating circuits.

It is another object of this invention to provide a system for discriminating between signals occurring at respectively different time intervals and which does not require that electronic timing circuits be employed to effect such discrimination.

Another object of this invention is to provide a vehicle detector system including a magnetic recording drum or disc having recorded on one track thereof a signal corresponding to each sound pulse to be transmitted and including also a magnetic transducer being energized by such recorded signal on each revolution of the drum and with said drum also having at least one other recording track upon which reflection signals of each transmitted sound pulse may be recorded.

Still another object of this invention is to provide a sonic vehicle detector system comprising a magnetic recording drum or disc revolving synchronously relative to the rate at which repetitive sound pulses are transmitted across the path of each passing vehicle and with at least one additional track having a recording medium placed on only that portion of its periphery which will pass through a cooperating relationship with a recording head for such track throughout the time interval encompassing the expected reception time of reflections of the last transmitted sound pulse and obtained from reflecting surfaces within a predetermined range of distance.

Other objects, purposes and characteristic features of this invention will in part be obvious from the accompanying drawings and will in part be pointed out as the description of the invention progresses.

To simplify the illustration, the various parts and circuits constituting the several embodiments of the invention are shown diagrammatically and certain conventional circuits and elements are illustrated in block form. The symbol (B+) and the symbol for a ground indicate connections made to the positive and negative terminals, respectively, of a source of suitable voltage for the operation of various electronic tubes and the like.

In describing the invention in detail, reference will be made to the accompanying drawings in which like reference characters designate corresponding parts in the several views, and in which:

FIGS. 1A and 1B illustrate a possible arrangement of the receiving and transmitting transducers;

Figure 4:
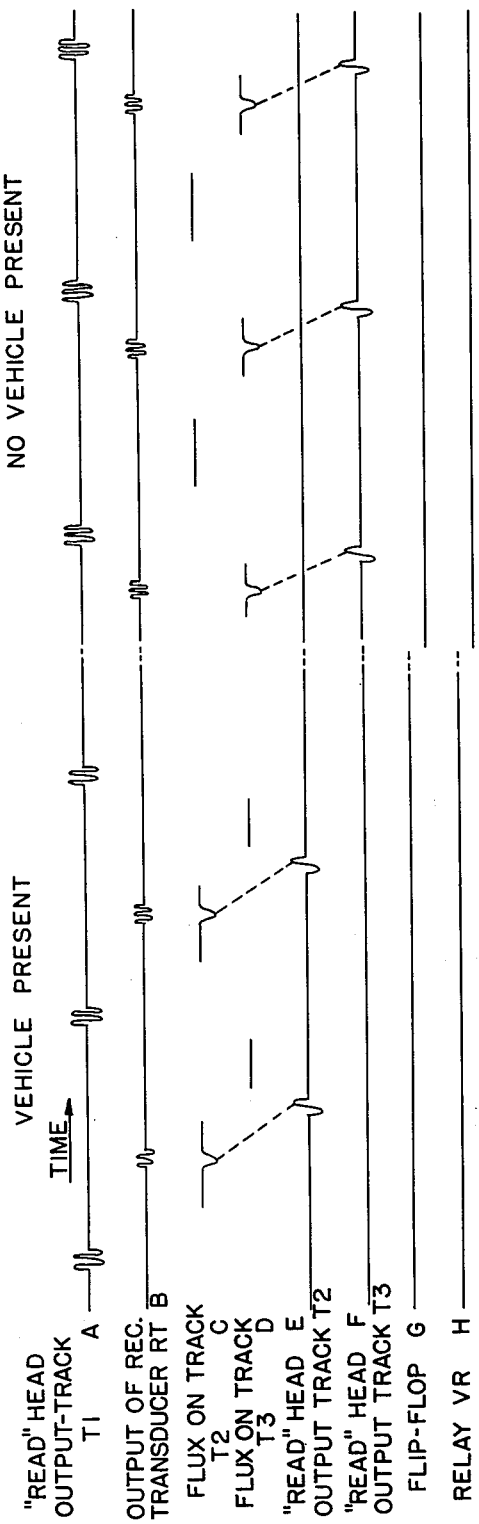
Figure 3:
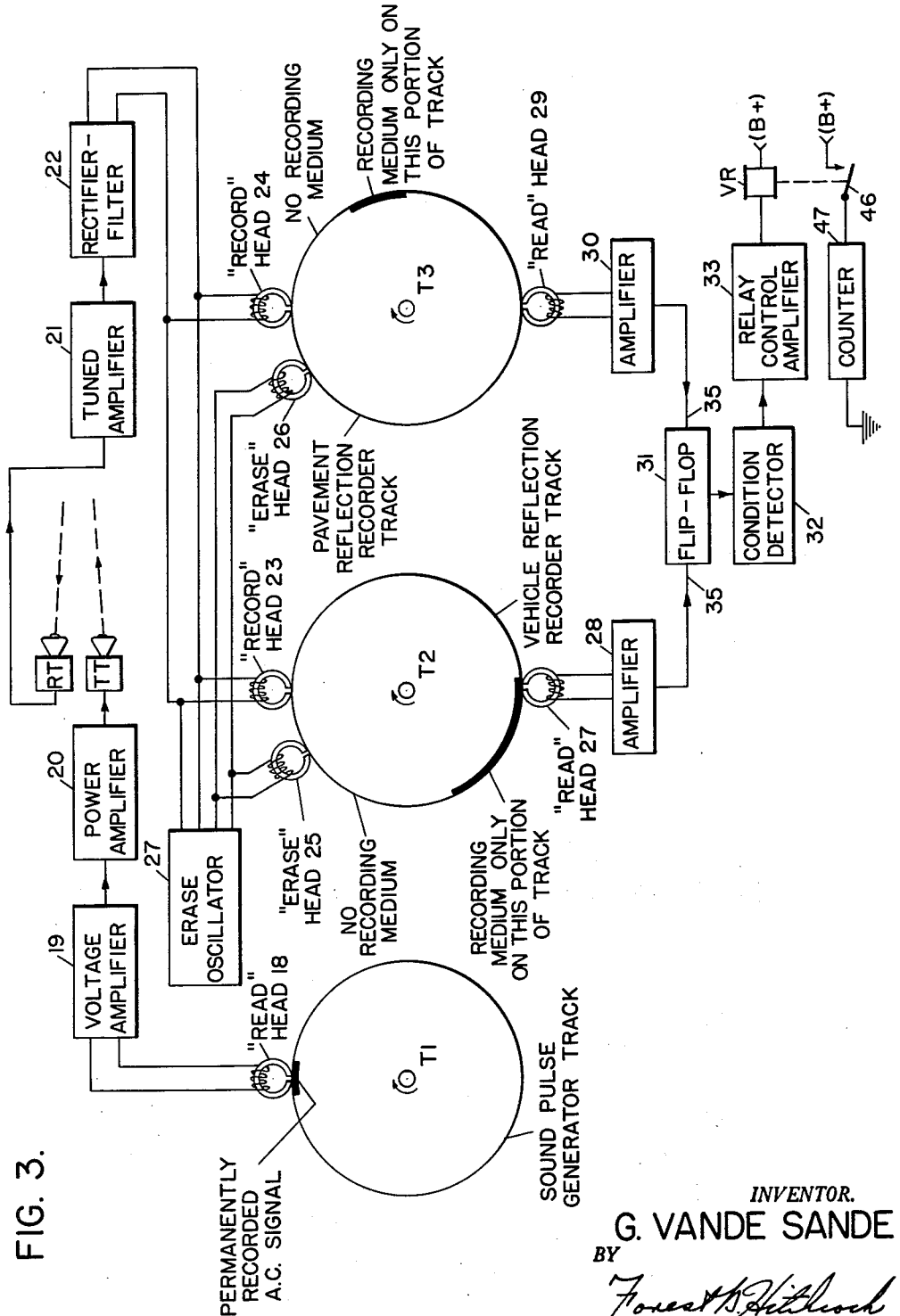
Figure 5:
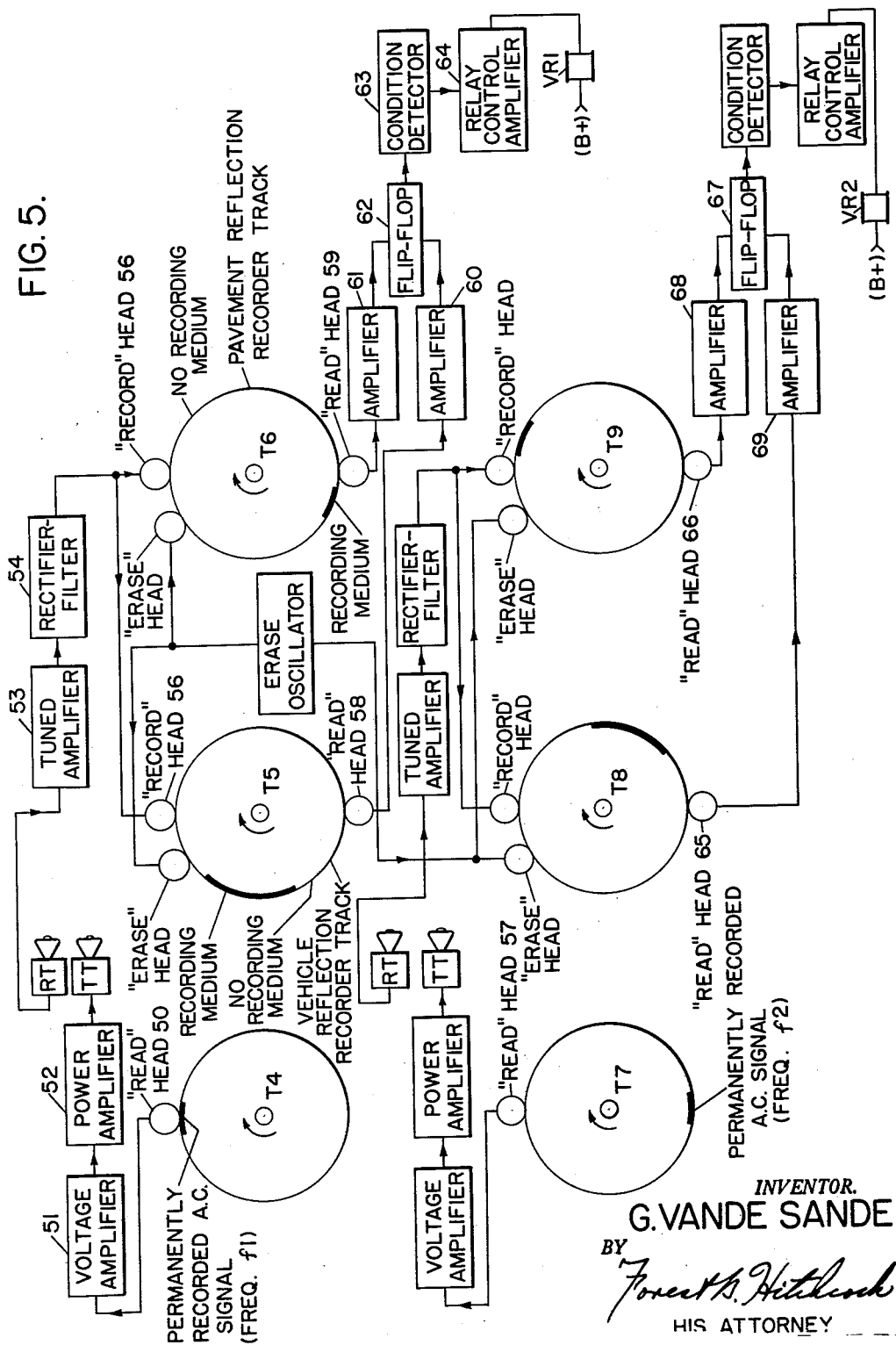

FIG. 3 diagrammatically illustrates one specific embodiment of this invention;

FIG. 4 is a wave form diagram illustrating diagrammatically certain time and phase relationships involved in the system;

FIG. 5 illustrates diagrammatically an alternative embodiment of the invention particularly useful where two or more vehicle detectors are adjacent each other and it is desired to eliminate interference between them; and FIG. 6 illustrates one possible embodiment of the circuit means provided for detecting whether pavement or vehicle reflection pulses are at any time being recorded on the drum.

FIG. 1A illustrates the manner in which the receiving and transmitting transducers RT and TT, respectively, may be positioned over a roadway and both directed downwardly. In the absence of any vehicles the sound pulses emanating from the transmitting transducer TT impinge upon the pavement and are then reflected back toward the receiving transducer RT as shown in FIG. 1A. FIG. 1B illustrates the reflection of the sound pulses from the top of the passing vehicle when it is within the beam and shows that reflections of these pulses are returned to the receiving transducer.

Figure 2:
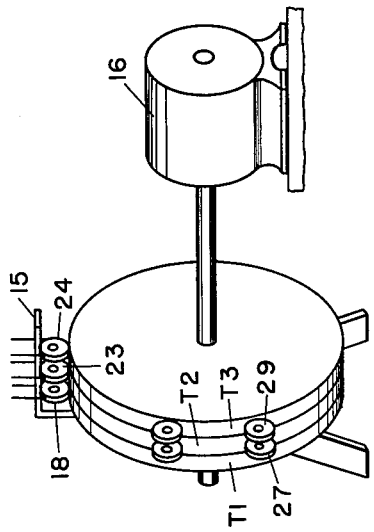
FIG. 2 illustrates diagrammatically a recording drum with its motor and various magnetic transducers associated with the respective tracks.

In FIG. 2 is illustrated diagrammatically a magnetic recording drum which may be used in the present invention. Recording drums of this general type are well-known in the art and it is therefore deemed unnecessary to describe them in any great detail here. The circular drum is formed of a non-magnetizable material such as aluminum and preferably machined to close tolerances to maintain a substantially constant spacing of its peripheral surface with respect to a number of magnetic transducers as it is rotated at a substantially constant predetermined speed by motor 16. The transducers are generally of toroidal shape, having at least one winding thereon and a very small air gap which is positioned closely adjacent the drum surface as particularly illustrated in FIG. 3. Various means are employed for mounting these transducers, and the method shown in the drawing whereby they are affixed to a bar 15 is merely a diagrammatic representation and does not necessarily accord with modern practice.

On selected portions of the drum surface, a magnetizable medium is deposited which may comprise magnetizable tape or a suitable coating of iron oxide particles. Any of the magnetic transducers may be used for both recording data on the drum and for reading it therefrom, although it is contemplated, in the present invention, that any particular magnetic transducer shall have only one function, i.e., either to record on the magnetic medium or to read a signal previously recorded thereon. Thus, energization of the winding of a particular transducer for a brief instant when the magnetic medium is directly opposite its air gap will magnetize that particular spot. As such magnetized spot then subsequently passes the air gap associated with another transducer provided for the purpose of reading information which might be stored on that track, a distinctive voltage will be induced in its winding. An erase head may also be associated with a selected track. Any part of the magnetic medium on such track which passes under the erase head at a time when it is energized will have any magnetization appearing thereon instantly removed.

FIG. 3 illustrates diagrammatically one embodiment of this invention utilizing a magnetic recording drum of the general type illustrated in FIG. 2. In FIG. 3 each of the several tracks of a drum which are associated with a particular vehicle detector organization are shown separately and are designated respectively as T1, T2, and T3. However, it will be understood that these do not necessarily represent separate discs or drums but are rather the individual tracks of a common drum device such as is shown in FIG. 2. Further, not only do all these three tracks then necessarily rotate at constant speed, but they must then also at all times maintain the exact same relative position with respect to each other.

With respect to the sound pulse generator track T1, upon each revolution of the drum, the signal permanently magnetized on this track induces a voltage in the winding of the read head 18. When it is desired that the sound pulses be transmitted, for example, with a frequency of 20 kc., then the signal recorded on track T1 is also of this frequency so that the winding associated with this read head 18 will, for each revolution of the drum, have a 20 kc. signal pulse induced therein. The signal which is induced in the winding of the read head 18 is then applied to the input of a voltage amplifier 19 whose output is applied to a power amplifier 20. The pulses of 20 kc. energy which are obtained from amplifier 20 are then applied directly to a transmitting transducer TT so that repetitive sound pulses are transmitted. It is ordinarily desired that each transmitted sound pulse have a relatively short duration on the order of approximately 1 millisecond and this is readily obtained by recording the 20 kc. signal on only a corresponding short portion of track T1. It is, of course, immaterial whether the magnetic medium is placed about the entire periphery of this track T1 or only in that small portion where the signal is recorded.

Since one sound pulse is transmitted for each revolution of the drum, the repetition rate of the sound pulses equals the drum r.p.m. Thus, a drum rotating at 1200 r.p.m. will cause sound pulses to be transmitted at the rate of 20 per second so that there is a 50 millisecond interval between successive pulses. As a rough approximation, it may be considered that the sound pulses travel at the rate of one foot per millisecond. Therefore, with a 50 millisecond period, the transducers may be positioned as much as 25 feet above the pavement and yet have each pavement reflection pulse be received before the next sound pulse is transmitted.

Sound pulse reflections which impinge upon the receiving transducer RT are converted to electrical signals which are applied to the input of a tuned amplifier 21. This amplifier 21 readily amplifies reflection signals having the frequency of the transmitted sound pulses but discriminates against other signals having different frequencies. The output signal of the tuned amplifier 21 is then applied to a rectifier-filter 22. As its name implies, this latter device rectifies the alternating-current signal obtained from amplifier 21 and also filters it, leaving a unidirectional voltage pulse which is then applied to both of the record heads 23 and 24. As will later be described, this makes it possible for each vehicle reflection pulse to be recorded on track T2 and each pavement reflection pulse on track T3. Incidentally, in accordance with well-known magnetic recording techniques, a small portion of the output of the erase and bias oscillator 27 is also applied to each record head 23 and 24 to facilitate the recording of the reflection signals on the magnetizable material. A frequency of operation of this oscillator of 100 kc. has been found to be satisfactory.

Each track has associated therewith an erase head 25 or 26, respectively, each being also energized continually by the erase and bias oscillator 27. Each erase head establishes an alternating magnetic field with a 100 kc. frequency in the vicinity of its air gap and thus is able to demagnetize the strip of recording medium on that track each time it passes under the respective erase head. Consequently, on each revolution, before each strip of magnetic medium passes the respective record head, any previously recorded signal is completely erased. The exact positioning of the erase heads is of no particular importance; it is only necessary that it be possible to erase each track on each revolution so that a new signal can be recorded thereon by the respective record head 23 or 24. As a practical matter, however, it is obviously desirable to position each erase head relatively near the record head for that track so that adequate space remains about the periphery of each track to position the read head in the desired position.

The positioning of the record head for each of tracks T2 and T3 with respect to that portion of the respective track having the recording medium thereon is important. (In the discussion that follows, it is assumed that the various relative positions referred to are those existing at a particular time when the drum is in a "reference" position. For convenience, this reference position is the drum position shown in FIG. 3 when a sound pulse is in the process of being generated by track T1.) With respect to track T2, it is necessary that the relative positioning be such that the recording medium on this track will be opposite the air gap of head 23 only throughout that interval of time encompassing the expected reception time of vehicle reflection pulses. In this way, a vehicle reflection pulse which energizes the winding of head 23 will always be recorded upon this track T2, but reflection pulses having different propagation times such as pavement reflection pulses or other stray reflections arriving at different times will energize head 23 at a time when there is no recording medium opposite the gap of head 23 and therefore cannot be recorded on track T2. A similar situation exists with respect to track T3. Record head 24 has a relative position with respect to the recording medium placed upon track T3 such that at the time of energization of the winding of this head 24 by a pavement reflection pulse, the recording medium for this track lies opposite the air gap so that it can be recorded. For reflection pulses having different delay times with respect to the last-transmitted pulse, only a blank portion of this particular track will be opposite head 24 so that it cannot possibly then be recorded.

As already mentioned, the repetition rate of the transmitted sound pulses is directly dependent upon the rotational speed of the drum, i.e., a drum speed of 1200 r.p.m. will cause the recorded signal on track T1 to pass the read head 18 twenty times each second so that 20 sound pulses will be transmitted each second and the period will then be 50 milliseconds. Since the period of one revolution is 50 milliseconds, one millisecond of delay corresponds to 7.2° of drum rotation. When the transducers are both approximately 20 feet above the pavement, the round-trip propagation time of a pavement reflection pulse will then be about 40 milliseconds, assuming again a sound velocity of one foot per millisecond. Thus, the drum will have rotated 40×7.2°=288° from the time when track T1 caused the last pulse to be transmitted before the pavement reflection will be received and result in the energization of record head 24. This determines the positioning of the magnetic material on track T3 as shown in FIG. 3. In order to allow for some variation in the delay time, the recording medium is so placed on track T3 that it extends around the edge of the drum of some distance to either side of the 288° position as illustrated in FIG. 3. Vehicle reflections, of course, have an appreciably shorter round-trip propagation time and this, in a similar manner to that just described, determines the positioning of the magnetic material on track T2 as well.

Each of the tracks T2 and T3 has a read head associated therewith. Each read head, such as the read head 27, may be identical to a record head previously described. As the air gap of the head passes a magnetized spot on the track representing a sound pulse reflection, a voltage pulse is induced in its winding. This induced pulse is applied to an amplifier such as amplifier 28 which is connected to the winding of read head 27 for track T2. A similar read head 29 is associated with track T3 and applies the voltage induced in its winding to a corresponding amplifier 30.

Assuming that there is no vehicle present within the sound beam, then each pavement reflection pulse energizes the winding of record head 24 at a time that a magnetization of the recording material on track T3 can occur. Eventually, as the head rotates further, this magnetized spot on track T3 passes the gap of read head 29 and induces a voltage in its winding which is then amplified by amplifier 30 and applied to input terminal 34 of flip-flop 31. Each transmitted sound pulse produces this sequence of events so that successive output pulses are obtained from amplifier 30 having a repetition rate corresponding to the rate of pulse transmission and thus also corresponding to the angular velocity of the drum. At such time, no signal can be recorded on track T2 and thus this track T2 is entirely devoid of any magnetization since it is constantly being erased on each revolution by the erase head 25. Therefore, no output pulses are obtained from amplifier 28 and applied to the other terminal 35 of flip-flop 31.

However, when a vehicle enters the sound beam, pavement reflections can no longer be obtained and, therefore, the record head 24 provided for track T3 is not energized any more at a time when the magnetizable material of this track lies opposite such head. Track T3 then ceases to provide an output pulse from read head 29 for each drum revolution since the last-recorded signal on track T3 is immediately erased therefrom by erase head 26. On the other hand, vehicle reflections are now obtained and each of these is recorded on track T2 such recorded signal is immediately read from this track by read head 27 so that a voltage pulse is applied to amplifier 28 and an input is then applied to the opposite terminal of flip-flop 31.

The above-described mode of operation is graphically illustrated in FIG. 4. The left-hand portion of this waveform diagram illustrates conditions existing when a vehicle is present; whereas, the right-hand portion illustrates the conditions existing when no vehicle is present. Line A illustrates the repetitively generated ultrasonic frequency pulses, one of which is generated for each revolution of the drum, and line B illustrates the output of the receiving transducer RT as it responds to reflection pulses. Each of the spaced horizontal lines of line C illustrates a period of time when the magnetizable material of track T2 is opposite record head 23, and this makes it possible for a vehicle reflection pulse to magnetize the material at a particular spot as diagrammatically illustrated by the negative-going variation in flux magnitude. Line E illustrates the voltage induced in the read head 24 provided for this track after a predetermined delay which is dependent upon the time required for the magnetized spot to travel to a position opposite read head 24. Lines D and F similarly illustrate the manner in which pavement reflections are recorded and then reproduced.

For convenience in illustrating the mode of operation of this invention, the read head 18 for track T1 and the record heads 23 and 24 for tracks T2 and T3, respectively, have been shown as being in the same relative position around the circumference of their respective tracks so that they are axially in line in the manner illustrated in FIG. 2. However, it will be entirely clear to one skilled in the art that it is by no means necessary that these various heads be aligned relative to each other. In actual practice, it is much preferred to have the heads for adjacent tracks spaced about the periphery of the drum since each head with its associated case is generally considerably wider than the track on the drum and it thus becomes impractical to space the heads for adjacent tracks in axial alignment along the drum surface. It is only significant that for each track there be the above-mentioned predetermined relationship between the position of the record head and the position of the magnetizable material on that track when the drum is in a "reference" position where track T1 is effective to cause a sound pulse to be transmitted.

FIG. 6 illustrates the circuit organization which may be used to detect whether repetitive output pulses are being obtained from amplifier 28 or from amplifier 30 and thus indicate whether or not a vehicle is present within the sound beam. The flip-flop 31 is shown in this FIG. 6 as including two interconnected electron tubes. Because of the feed-back connections between the two tubes, the flip-flop has two stable conditions and operates almost instantaneously from one to the other, in response to input pulses obtained respectively from amplifiers 30 and 28. More specifically, the amplifiers 28 and 30 are both organized to provide a positive-going voltage pulse to the respective grids of tubes V6 and V7. Whenever no vehicle is present so that successive positive-going pulses are obtained from amplifier 30, tube V6 has its grid driven positively by each such pulse and the flip-flop therefore remains in the state wherein tube V6 is fully conductive and tube V7 is fully cut off. If, on the other hand, a vehicle enters the sound beam, then positive-going pulses are no longer obtained from amplifier 30 but they are instead then obtained repeatedly from amplifier 28. As a result, the flip-flop is operated to the opposite stable state wherein tube V7 is fully conductive and tube V6 is cut off.

Whenever the flip-flop is in the first of the stable states just described, the voltage at the plate of tube V7 is at a high level because of the non-conductive condition of this tube. Because of this condition, capacitor 40 is charged to a relatively high positive potential through diode 41 and through back contact 42 of relay VR so that the grid of tube V8 is driven to the conductive region. Its plate voltage is then reduced substantially because of the large voltage drop across plate resistor 36 with the result that the grid voltage of tube V9 is sufficiently reduced with respect to its positive cathode that relay VR in the plate circuit of tube V9 will drop away. At this time, the cathode of tube V9 is maintained at a positive potential because of the flow of the plate cathode current of tube V8 through its cathode resistor 38.

If it is now assumed that a vehicle is just in the process of entering the beam of repetitive sound pulses, then it is quite likely that the receiving transducer will, for a brief interval, receive both vehicle reflection pulses and pavement reflection pulses. In other words, there is a brief interval of time as the vehicle enters the sound beam when vehicle reflection pulses are received by the receiving transducer but pavement reflection pulses are still also being received since the vehicle has not yet moved fully into the position where it is able to block the sound beam entirely from impinging upon the pavement. At such time, both amplifiers 28 and 30 will produce repetitive output pulses and these will alternately be applied to the grids of tubes V6 and V7, thereby causing the flip-flop to operate alternately from one stable state to the other going through a complete cycle for each revolution of the drum. Tube V7 will then alternately shift between conductive and non-conductive conditions so that its plate voltage will vary alternately between predetermined low and high values.

When the plate voltage of tube V7 has steadily been at the higher level so that relay VR is dropped away, and thereafter is abruptly decreased in value for a brief interval, there can be but little effect upon the high level of charge stored in capacitor 40. The reason for this is that any discharging current through tube V7 then encounters the high back resistance of rectifier 41. However, each time that tube V7 is momentarily operated again to the non-conductive state, capacitor 40 can quickly regain any charge it might have lost because the charging current encounters only the low forward resistance of diode 41. When relay VR is dropped away, as is now assumed, resistor 43 also provides a discharge path for capacitor 40, but this discharge path has a time constant which is several times the period of one drum revolution so that it can produce only a slight decrease in charge on capacitor 40 each time that tube V7 becomes conductive. From this it will be apparent that when capacitor 40 has become positively charged in the manner just described by reason of tube V7 having been for a time cut off, any rapid alternation of states of flip-flop 31 will not appreciably affect the charge on capacitor 40 and thus will not result in operation of relay VR.

If it is now assumed that the vehicle is fully within the beam of the transmitted sound pulses, then positive-going output pulses can no longer be obtained from amplifier 30 but they are then repeatedly obtained from the output of amplifier 28. The flip-flop then remains in the state wherein tube V7 is fully conductive so that its plate voltage becomes and remains at a low level. Capacitor 40 can then discharge through resistor 43 to which its upper terminal is connected through back contact 42 of relay VR. Thus, if flip-flop 31 remains in the state wherein tube V7 is conductive for any substantial length of time, capacitor 40 discharges through resistor 43 until eventually the voltage at its upper terminal reaches a level where the plate current of tube V8 approaches or perhaps even reaches the cut-off level. As this happens, its plate voltage rises and causes the grid voltage of tube V9 to overcome its positive control bias. This, in turn, increases the plate current of tube V9 to a value where relay VR will pick up.

The picking up of relay VR closes its front contact 42 so that the upper terminal of capacitor 40 is now connected through resistor 44 to the B(+) voltage source. A low resistance discharge path is now provided for capacitor 40 through diode 45 and the low resistance plate-cathode circuit of conductor tube V7 which permits a further rapid discharge of this capacitor and maintains the voltage at its upper terminal substantially at the low value which now appears at the plate of tube V7. Tube V9 continues to conduct steadily, therefore, so that relay VR remains picked up.

As the vehicle continues its progress and finally starts to pass out of the beam of sound pulses, the condition is finally reached again where both pavement and vehicle pulses are received alternately so that both amplifiers 30 and 28 apply alternate positive-going input pulses to the grids of tubes V6 and V7, respectively. This causes the flip-flop again to operate alternately between its opposite states so that the voltage at the plate of tube V7 varies repeatedly between high and low levels. Each time that tube V7 becomes non-conductive so that its plate voltage rises, this voltage increase appears also across the series combination of diode 45 and capacitor 40, but it is not effective to charge capacitor 40 positively to any appreciable extent because of the high back resistance of diode 45. However, the mere fact that there is now no low voltage at the plate of tube V7 tending to maintain the voltage at the junction of diode 45 and resistor 44 at a correspondingly low level, makes it possible for capacitor 40 to charge through an alternative charging circuit which extends from (B+) and through resistor 44. Since the time constant for this charging circuit is relatively slow, capacitor 40 cannot become appreciably charged as long as the flip-flop keeps alternating between its opposite states, because the capacitor is quickly discharged through diode 45 each time that tube V7 becomes conductive.

However, when conditions finally are such that tube V7 remains non-conductive because only pavement reflection pulses are received, then capacitor 40 can become fully charged through resistor 35. When this happens, the relay control tube V9 becomes non-conductive so that relay VR is restored to its normal, dropped away condition. Capacitor 40 is then again connected through back contact 42 and diode 41 to the place of tube V7 so that it can quickly charge to the high voltage level then present at the plate of this tube.

As long as only pavement reflections are received, therefore, the flip-flop remains steadily in the condition wherein tube V7 is cut off and this results in relay VR being dropped away. When the other stable condition is reached such that only vehicle reflection pulses occur, then the flip-flop is in the opposite state wherein tube V7 is fully conductive and this results in the picking up of relay VR. However, rapid alternations of the flip-flop between its opposite states cannot result in operation of relay VR from its last-operated condition. In this way the high degree of discrimination which is achieved in the previously mentioned application Serial No. 808,736 is here again achieved in that relay VR can pick up and close its front contact 46 to thereby energize counter 47 (see FIG. 3) only provided that vehicle reflections are received concurrently with the total absence of pavement reflections. Also, relay VR can thereafter drop away and de-energize counter 47 so as to permit its subsequent re-energization for another vehicle only when vehicle reflections are no longer received but pavement reflections are once again concurrently received.

The embodiment of the invention illustrated in FIG. 5 is particularly useful when there are adjacent vehicle detectors which are likely to interfere with each other. Such interference results, for example, when stray reflection pulses from one sound beam are reflected back toward the receiving transducer associated with another sound beam for a different vehicle detector. Such a stray reflection may have a rather devious path and its propagation time, therefore, might even be sufficiently long that it will appear to the receiving circuits for the other sound beam as a pavement reflection. If, at that same time there should be a vehicle present within such other sound beam, then the receiving transducer for that other beam will concurrently be receiving vehicle reflections from that particular vehicle and also what appears to be pavement reflections. Under these circumstances, as we have seen, there can be no registration of that particular vehicle. There are various other ways in which two adjacent units may interfere with each other; the one just mentioned is a typical situation that may exist.

One way in which such interference may be reduced materally is to cause the sound pulses for the adjacent vehicle detectors to be respectively different frequencies. Since the receiver for each beam preferably comprises a tune amplifier which is turned to amplify only reflection pulses having the particular preselected frequency of the corresponding beam, it will tend to reject reflection pulses at other frequencies. Such discrimination is, of course, a matter of degree and it has been found that under some circumstances all interference cannot be eliminated in this manner.

In the prior application of Auer, Serial No. 30,667, May 20, 1960, previously referred to, there is disclosed a system whereby any possible interference between nearby units is completely eliminated. Generally, in such system, a time sharing procedure is employed in that the adjacent units transmit sound pulses alternately. When one unit has transmitted a sound pulse, a sufficient interval is allowed to lapse before the otherwise interfering unit transmits its sound pulse to allow for the reception of all genuine reflection signals from the first transmitted pulse. At the end of such time, the pulse from the other unit is transmitted and after an interval which is long enough to permit for the reception of all bona fide reflections of such pulse, another pulse is again transmitted from the first unit, and so on.

The system shown in FIG. 5 provides for this alternation of the two otherwise interfering units in a very convenient manner. In the upper portion of this figure are illustrated three individual tracks T4, T5 and T6 on a recording drum of the kind shown in FIG. 2, and these three tracks are associated with one detector unit. The tracks T7, T8 and T9 are similarly associated with the adjacent unit. Both tracks T4 and T7 have prerecorded signals thereon. These are at different respective frequencies $f1$ and $f2$ and are also spaced substantially 180° apart so that, as the drum revolves, for each 180° of rotation, one or the other of the two signals is induced in the winding of the respective read head 50 or 57. The signal induced in the winding of the read head 50 is amplified by voltage amplifier 51 and power amplifier 52 and applied to the transmitting transducer TT. The output signal of read head 57 for track T7 is similarly amplified and applied to a corresponding transmitting transducer.

Both vehicle and pavement reflection pulses impinging upon the receiving transducer associated with tracks T4, T5 and T6 are applied through tuned amplifier 53 and rectifier-filter 54 to both the record heads 55 and 56 provided respectively for tracks T5 and T6. As with the embodiment of FIG. 3, track T5 will record only vehicle reflection pulses and track T6 will record only pavement reflection pulses and this discrimination occurs entirely because of the selective placement of the recording medium on each of these two tracks as previously explained in connection with FIG. 3. However, it will be noted that in comparison with what is shown in FIG. 3, the recording medium for these two tracks is positioned differently than was shown in FIG. 3. The reason for this is that only one-half of the drum surface is allocated to the detector unit associated with tracks T4, T5 and T6 and the remaining half is allocated to the adjacent unit which is associated with tracks T7, T8 and T9. In other words, starting with the initial position of the drum illustrated in FIG. 5, where a sound pulse is being generated by track T4, through the first 180° of drum rotation, any reflection pulse resulting from such transmitted pulse will have been received and have resulted in the energization of both heads 55 and 56. If such reflection pulse was a vehicle reflection it will have been recorded on track T5; whereas, if it was a pavement reflection pulse it will instead have been recorded on track T6. It will be appreciated that it is readily possible to record the reflections of any one sound pulse on only one-half of the drum surface by merely rotating the drum with a lower angular velocity. Thus, referring to FIG. 5, the drum speed is made sufficiently slow so that 180° of rotation will require a time interval at least as long as the round-trip propagation time of the most distant reflection desired to be recorded which is generally the pavement reflection.

After the drum has completed one-half turn from the initial position shown, the prerecorded signal on track T7 will then oppose the read head 57 so that a sound pulse will be transmitted from the particular transmitting transducer associated with these tracks T7–T9 as previously described. During the remaining half-turn of the drum, the tracks T8 and T9 will both rotate in such manner that the magnetic material appearing thereon will pass the respetcive head associated with that track so that any vehicle reflection pulse that might be received can be recorded on track T8 and, similarly, any pavement reflection will be recorded on track T9.

As with the embodiment of the invention illustrated in FIG. 3, the tracks T5 and T6 both have read heads 50 and 57 respectively associated therewith so that any recorded signal appearing on either track can immediately be read from that track prior to its being erased therefrom. The output of each head 58 and 59 is applied through a respective amplifier 60 and 61 to a flip-flop 62 and the condition of this flip-flop then determines the condition of the corresponding vehicle detector relay VR1. The flip-flop 62, condition detector 63, and relay control amplifier 64 correspond to those shown in FIG. 6 and operate in the same manner. Similar read heads 65 and 66 are associated with tracks T8 and T9 and control the corresponding flip-flop 67 through amplifiers 68 and 69 and also another vehicle detector relay VR2.

When this embodiment of the invention is used, not only is there the discrimination on the basis of frequency which aids in rejecting a reflection from another nearby unit, but also the time-sharing effect greatly minimizes the posibility that a sound pulse from one unit can be received by another. The manner in which this alternation occurs in the embodiment of FIG. 5 ensures that the proper phase relationships between the two units will at all times be properly maintained. Also, the result is accomplished without requiring that any additional electronic circutry be employed to produce alternating, properly phased operation of the respective vehicle detectors. It is recognized that this time-sharing operation brings about a reduction in the maximum possible repetition rate with respect to any particular one unit. This, however, can oftentimes be readily tolerated, particularly where the traffic to be detected is moving relatively slowly since then, even with the slower repetition rate, a substantial number of sound pulses will impinge upon each passing vehicle so that it can still be easily detected.

In both the embodiments illustrated herein, both vehicle and pavement reflections have been utilized, thereby requiring that both be separately recorded on the drum so that they can be distinguished. There are numerous instances, however, where the high degree of discrimination which is afforded by making use of both vehicle and pavement reflections is not necessary. It may well occur in a particular situation that it is possible to obtain entirely satisfactory results by using only the vehicle reflection pulses. Thus, the pavement reflection pulses may be entirely ignored and only the vehicle reflection pulses recorded upon the drum. Numerous advantages still result from use of the drum, however, in that it provides a highly convenient means by which the vehicle reflection pulses may be distinguished from and segregated from reflections from other sources including those from the pavement.

As an alternative, it may prove desirable in certain other circumstances to use only the pavement reflection pulses. These are normally received, of course, when no vehicle is present and the drum makes it readily possible to distinguish these from other reflections including vehicle reflections. When a vehicle passes through the sound beam, the pavement reflections are no longer received. At such time, no signal is recorded upon the track of the drum which is particularly provided for recording such pavement reflections. The output circuit then recognizes this condition and is distinctively operated so as to provide an indication of vehicle presence.

In the various embodiments illustrated, it has been shown that electrical signals are magnetically recorded upon the circumferential surface of a drum. However, it will be readily appreciated by one skilled in the art that the invention is not limited to magnetic recording upon a drum surface but applies equally well when the recording takes place upon an endless magnetic tape, for example, or upon magnetizable tracks appearing upon the face of a revolving disc.

Having described a vehicle detector system employing a magnetic drum which provided both for the transmission of sound pulses and the selective detection of echo pulses, it should be understood that the embodiments illustrated are considered as merely being typical and that various modifications and alterations may be made to this specific form shown without departing from the spirit or scope of this invention.

What I claim is:

1. In a system for detecting the presence of a vehicle as it passes through a detection zone defined by at least one beam of repetitive sound pulses the combination comprising, transmitting means including an electroacoustical transducer for transmitting said repetitive pulses across said detection zone so as to impinge upon said vehicle passing therethrough, receiving means including an electro-acoustical transducer being positioned and directed to receive reflections of said sound pulses from said vehicle, means including a magnetic storage drum rotating with a substantially constant angular velocity and having at least one track thereon upon which electrical signals may be selectively recorded, said transmitting means being controlled by said drum as it passes through at least one predetermined angular position to transmit a respective one of said sound pulses, at least one electro-magnetic recording transducer for recording on said track, said recording transducer being energized by the output of said receiving means whereby it is energized in response to a vehicle reflection signal only during a predetermined time interval following the transmission of the last sound pulse which encompasses the expected reception time of a vehicle reflection pulse, said track having magnetizable material deposited only on that portion thereof which will pass through a magnetic coupling relationship with said recording transducer during said predetermined time interval, whereby only vehicle reflections are recorded on said track, circuit means including a reading electro-magnetic transducer positioned in a magnetic coupling relationship with said track so that any magnetization appearing thereon induces a signal in said reading transducer as it passes said reading transducer, erasing means for removing any magnetization from said track after it passes said reading transducer and before it passes said recording transducer, and circuit means being distinctively controlled by the output signal of said reading transducer for indicating the presence of a vehicle in said beam.

2. The system as defined in claim 1 wherein an additional track has recorded permanently thereon a signal representing the sound pulse to be transmitted and a reading electro-magnetic transducer is positioned to have said signal induced therein each time said drum passes through said predetermined angular position, said transmitter means including amplifier means coupled between said last-named reading transducer and said electro-acoustic transmitting transducer.

3. In a system for detecting the presence of a vehicle as it passes through a detection zone defined by at least one beam of repetitive sound pulses the combination comprising, transmitting means including a sound transducer for transmitting said repetitive sound pulses across said detection zone so as to impinge upon a fixed reflecting surface in front of which said vehicle passes thereby blocking said surface from receiving said pulses, receiving means including a sound transducer being positioned and directed to receive reflections of said sound pulses from said fixed reflecting surfaces when no vehicle is present, each sound pulse reflection from said fixed reflecting surface occurring within a predetermined time interval following its transmission, means including a magnetic storage drum rotating with a substantially constant angular velocity and having at least one track thereon upon which electrical signals may be selectively recorded, said transmitting means being controlled by said drum as it passes through at least one predetermined angular position for transmitting a respective one of said sound pulses, at least one recording electro-magnetic transducer having a winding and being positioned relative to the surface of said drum to permit the magnetic recording on the associated track of an electrical signal applied to its winding, said transducer having its winding energized by the output of said receiving means whereby it is energized in response to a reflection from said fixed reflecting surface only during said predetermined time interval, said track having magnetizable material deposited only on that portion thereof which lies directly opposite said recording transducer during said predetermined interval as said drum rotates, whereby only a reflection pulse received by said receiving transducer during said predetermined interval can be recorded on said track, erasing means associated with said track for obliterating the magnetization thereon prior to its again passing through a magnetic coupling relationship with said recording transducer, a reading magnetic transducer positioned in a magnetic coupling relationship with said track, whereby any reflection signal recorded on said track induces a voltage in the winding of said reading transducer prior to its being erased by said erasing means, and circuit means being distinctively controlled by the output signal of said reading transducer to thereby indicate the presence of a vehicle in said beam.

4. The combination as defined in claim 3 wherein said drum has an electrical signal magnetically permanently recorded on a predetermined portion of a selected track corresponding to the desired sound pulse to be transmitted, a magnetic reading transducer is positioned so as to pass through a magnetic coupling relationship with said recorded signal on said selected track for each revolution of said drum, and said transmitting means includes an amplifier coupled between said magnetic reading transducer and said sound transmitting transducer.

5. In a system for detecting the presence of a vehicle as it passes through a detection zone defined by a beam of repetitive sound pulses the combination comprising, transmitting means including a transmitting transducer being so positioned and directed as to transmit said sound pulses toward said vehicles, said sound pulses impinging upon a vehicle occupying said detection zone but impinging instead when no vehicle is present upon a more distant reflecting surface which is blocked from receiving said sound pulses only when said vehicle is within said detection zone, receiving means including a receiving transducer being positioned and directed to receive reflections of said sound pulses both from said vehicle and from said fixed reflecting surface, said receiving means providing an output signal in response to a vehicle reflection during a first predetermined time interval following the transmission of said sound pulse and providing an output signal in response to a reflection from said fixed reflecting surface during a second predetermined interval occurring after said first interval, a magnetic storage drum having at least two tracks each of which may have a preselected portion thereof distinctively magnetized provided said portion is opposite a respective magnetic recording transducer whose winding is then energized, each of said recording magnetic transducers having its winding connected to the output of said receiving means, a first of said tracks having magnetizable material deposited only on that portion of its periphery which will pass through a magnetic coupling relationship with the associated recording transducer during said first predetermined interval, a second of said tracks having magnetizable material deposited only on that portion of its periphery which will pass through a magnetic coupling relationship with the associated recording transducer during said second predetermined interval, erasing means associated with each of said tracks for removing therefrom any recorded signal prior to the passage of the magnetic material thereon into a magnetic coupling relationship with the respective recording head, a reading magnetic transducer associated with each track and having a voltage induced in its winding provided that a magnetized spot on the respective track passes through a magnetic coupling relationship therewith, and means being controlled jointly by the voltages appearing across the windings of the two respective reading transducers and being operated to a distinctive condition to indicate the presence of a vehicle only when an output voltage is obtained from said reading transducer associated with said first track and concurrently therewith there is no output signal obtained from the reading transducer associated with said second track.

6. In a system for detecting the presence of objects, detection apparatus including transmitting means comprising an electro-acoustic transmitting transducer for directing a beam of repetitive sound pulses toward said objects, receiving means including an electro-acoustic receiving transducer for receiving reflections of said sound pulses, magnetic recording means including at least one endless track having magnetizable material on at least one selected portion thereof and being moved continually with substantially constant velocity through a close magnetic coupling; relationship with a plurality of electromagnetic transducers, said transmitting means being controlled by said recording means each time said track passes through a predetermined position for generating a respective one of said sound pulses, a first one of said electro-magnetic transducers being associated with said track being energized by the output of said receiving means, said track having said magnetizable material only on that portion of its length which will pass through said close magnetic coupling relationship with said first transducer during a predetermined time interval occurring after said track is in said predetermined position and encompassing the expected time of reception of reflection pulses from reflecting surfaces lying within a respective range of distances from said detecting apparatus, whereby each reception of a reflection during said predetermined interval results in the magnetization of a corresponding spot on said track which at that instant lies opposite said first electromagnetic transducer, a second electro-magnetic transducer being energized by said magnetized spot as it subsequently passes said second transducer, erasing means being positioned relative to said track so that said track is erased after passing said second transducer and before passing said first transducer, and means connected to said second transducer and being distinctively controlled by the occurrence of successive outputs of said second transducer for indicating the presence of an object within said given range of distance.

7. The system as set forth in claim 6 wherein said magnetic recording means comprises a magnetic recording drum and said track lies circumferentially about its surface.

8. In a vehicle detector system, a plurality of vehicle detector units each comprising transmitting means including an electro-magnetic transducer for directing a beam of repetitive sound pulses toward said vehicles, and receiving means including an electro-acoustical transducer for receiving reflections of said sound pulses, said system also including a magnetic storage drum having first and second tracks each with a signal permanently recorded thereon magnetically and representing a sound pulse to be transmitted, an electro-magnetic transducer associated with each of said first and second tracks and generating an output signal therein as the recorded signal on the respective track passes through a close magnetic coupling relationship with said transducer as said drum rotates with substantially constant angular velocity, said two recorded signals on said first and second tracks being so relatively positioned with respect to the respective electro-magnetic transducers that said two signals are induced therein alternating at substantially equally spaced intervals on substantially successive half-revolutions of said drum, at least one track on said drum being associated with each vehicle detector and having an electromagnetic recording transducer connected to the receiving means of the associated vehicle detector, each said last-named track having magnetizable material only over a predetermined portion of its length which passes through a close magnetic coupling relationship with the associated recording transducer during a predetermined time interval during which reflections can be expected from vehicles upon which the sound beam impinges, said drum revolving with a sufficiently slow speed that said magnetizable material appears on the first half of the periphery of said track following the generation of the last transmitted sound pulse, electro-magnetic reading transducer means associated with each of the two last-named tracks and having a distinctive voltage induced therein when a magnetized spot on the respective track passes through a close magnetic coupling relationship therewith, erasing means for each of the two last-named tracks for erasing any magnetization appearing thereon after passing the reading transducer for such track and prior to passing the recording transducer for such track, and circuit means connected to each said reading transducer means and being distinctively operated in response to the output signals obtained therefrom for indicating the presence of a vehicle in the respective sound beam.

9. The vehicle detector system of claim 8 wherein the permanently recorded signals on said first and second tracks are of respective different frequencies.

10. In a system for detecting the presence of objects, detection apparatus including transmitting means for directing a beam of repetitive energy pulses of a distinctive frequency toward the object to be detected, receiving means including a receiving transducer for receiving reflections of the transmitted pulses from said object, said transmitting means transmitting said pulses with a sufficiently slow repetition rate that the period between successive pulses of the same frequency at least equals the round-trip propagation time of an energy pulse between said transmitting means and said receiving transducer when reflected from an object to be detected, recording means coupled to said receiving means and recording only output signals from said receiving means resulting from reflection pulses impinging upon said receiving transducer during a preselected interval following the transmission of each pulse and therefore received only from objects within a preselected range of distances from said detection apparatus, output means coupled to said recording means and distinctively controlled by the signals recorded on said recording means to indicate the presence of an object, said recording means including a first transducer energized by the output of said receiving means and also including a recording track moved with a substantially constant velocity relative to said first transducer, means for controlling the rate of energy pulse transmission in response to the relative velocity between said first transducer and said recording track, said track having a signal recording medium thereon only over those portions of its length which are directly opposite said first transducer during said preselected interval, said output means including a second transducer also in close proximity with said track and moving relative thereto with the same velocity as said first transducer and being energized when a signal recorded on said track by said first transducer passes said second transducer, and erasing means for erasing any signals recorded on said track prior to its passing said first transducer.

11. The system of claim 10 in which the energy pulses are sound pulses and said recording medium comprises a magnetic coating on said track which is an endless track.

12. Apparatus having at least one input circuit and one output circuit and producing an output signal at said output circuit only in response to an input signal which is applied to said input circuit during a time interval of predetermined duration and occurring a preselected time after a known prior event, comprising in combination, an endless track carrying at least over a selected portion thereof a signal recording medium, signal recording means in juxtaposition with respect to said track and coupled to said input circuit to enable the selective recording of a signal on said signal recording medium in response to the application of an input signal to said input circuit, means for moving said track with a substantially constant velocity past said signal recording means and in synchronous relation with respect to the occurrence of said prior event, said track having said signal recording medium disposed thereon only over that portion of its length which lies in a recording relationship relative to said signal recording means throughout said time interval, signal reading means also in juxtaposition relative to said track and responsive to any signal recorded thereon to apply an output signal to said output circuit, and erasing means also in juxtaposition relative to said track for at least at times removing from said track any signal recorded thereon as each part of said track passes through an erasing relationship relative to said erasing means.

13. Time gating apparatus having an input circuit and an output circuit and producing an output signal at said output circuit only in response to an electrical signal applied to said input circuit during a predetermined time interval following a reference timing signal and comprising, a track having a recording medium on a selected portion of its surface, signal recording means including a receiving transducer in juxtaposition with said track and electrically coupled to said input circuit for recording a distinctive signal on said recording medium in response to an electrical signal applied to said input circuit, signal reading means including a reading transducer in juxtaposition with said track and responsive to a signal recorded thereon for applying a corresponding output signal to said output circuit, signal erasing means for at least at times erasing signals recorded on said track but being ineffective to erase any portion of said track which at any instant lies between said recording transducer and said reading transducer, means for transporting said track longitudinally relative to said transducers and with a predetermined synchronous relation in relation to said timing signal, whereby each portion of said track in succession passes each said transducer, said track having said recording medium only on that portion of its length which lies opposite said recording transducer throughout said predetermined time interval.

14. The apparatus as defined in claim 13 wherein said recording medium is a magnetizable material.

15. The apparatus as defined in claim 13 wherein said endless track is a circumferential track about the surface of a rotatable drum.

16. The apparatus as defined in claim 13 wherein said erasing means is continually operable.

No references cited.